United States Patent Office 2,761,464
Patented Sept. 4, 1956

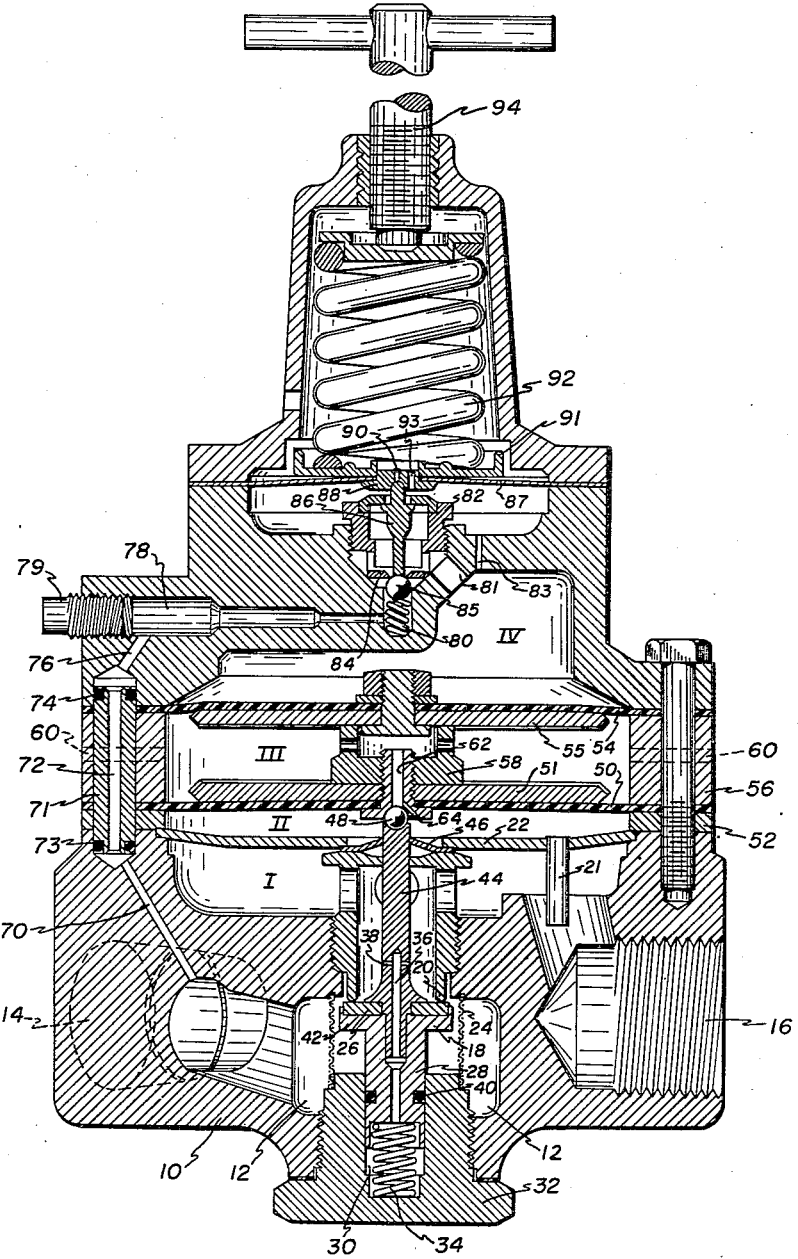

2,761,464

PILOT CONTROLLED REGULATOR

Delbert G. Faust, Englewood, Colo., assignor to C. A. Norgren Co., Englewood, Colo., a corporation of Colorado Application June 8, 1953, Serial No. 360,179

3 Claims. (Cl. 137—116.3)

This invention relates to a pressure regulator and more particularly to a pilot controlled fluid pressure regulator which is a unitary device adapted to precisely supply fluid at a predetermined pressure over a very large range of flow rates and a large ranges of pressures.

In general, spring controlled pressure regulators are only accurate over very narrow ranges of flow rates and usually in the lower ranges of flow. Also, the regulators have limited pressure ranges for each spring used. To extend the range the spring must be changed. The spring loaded regulators are furthermore subject to many sources of variation which affects the accuracy of the regulating characteristics of regulators. The springs under a compression load are subject to twisting, cocking of the spring, temperature changes, etc., which affect applied force of the spring. As the flow rates through the regulator vary, due to demand changes, the length of spring changes and the applied force of the spring changes and the controlled pressure and flow rates change.

According to the present invention there is provided a main pressure regulator which is not directly spring loaded and is, therefore, not subject to the disadvantages of the spring loaded pressure regulators. Accordingly, the pressure regulator of this invention has a chamber with a flexible wall or diaphragm, interconnected with the control valve of the pressure regulator. The chamber is under a predetermined fluid pressure to supply the actuating force to the control valve. The chamber, through the flexible wall, transmits substantially the same force on the control valve (at the same control pressure) no matter what distention the diaphragm is under due to the varying flow requirements through the regulator. Further, varying primary pressures affect the operation of the valve only very slightly.

A spring loaded pilot control valve, which operates under very low flow characteristics, is provided to precisely control the pressure acting on the diaphragm. The pilot control valve provides the precisely controlled pressure on the diaphragm no matter what distention the diaphragm is under. The supplying of precise pressure under substantially any diaphragm distention permits the main regulator to pass precisely controlled fluid over a large range of flow rates and a large pressure range.

It is an object of the present invention to provide a fluid pressure regulating valve which precisely regulates pressure of a fluid passing therethrough over a very wide range of flow and pressure requirements.

Another object of the present invention is to provide a unitary fluid pressure regulating valve.

Another object of the present invention is to provide a pressure regulating valve which is not affected by a fluctuating or varying supply source.

These and other objects of the present invention will be apparent by referring to the following description and appended drawing in which the figure is a cross sectional view of the regulating device according to the present invention.

The device, illustrated in the figure, comprises a body 10 having a passage 12 therethrough. The passage has an inlet 14 and an outlet 16 adapted to be connected to a compressed fluid conduit. A valve 18 in the passage is adapted to open and close the passage and control fluid passing therethrough. The valve seats against a seat 20 which is removably disposed in the passage. A baffle 22 in the body substantially completes the passage 12 passing through the body. A screen or filter 24 is so placed in the passage that no foreign matter entering the inlet 14 will reach the valve 18.

The valve 18 has a soft material face 26 for positively closing passage when valve 18 seats against the seat 20. Under normal operation the face 26 may be a rubber-like material, such as neoprene, but the face is readily changeable for varying operating characteristics. An extension 28 extends below the valve 18 into a recess 30 in a removable plug 32. A spring 34 in the recess 30 normally urges the valve toward closed position. A passage 36 extending through the valve interconnects the recess 30 and the outlet side of the valve, through an adjoining passage 38 on the outlet side of the valve. The extension 28 is reciprocally sealed in the recess by means of an O-ring seal 40. The sealed recess and the interconnecting passages provides means for substantially balancing the pressure forces across the valve itself. By varying the effective areas exposed to the primary and the secondary pressures across the valve the operating characteristics of the valve may be substantially changed. For instance, by increasing the area 42 below the valve seat (actually the diameter of the extension 28 is decreased to increase the effective area) heavy loads may be required to actuate the valve initially, which will give a certain operating characteristic. Likewise by decreasing the area 42 (increasing the diameter of extension 28) very light loads may be necessary to initially actuate valve and so the operating characteristics will be substantially different than where the area is larger. The valve may thus be substantially balanced, where the effective exposed area on the outlet side equals the effective exposed area under the extension 28. When substantially balanced, variations in inlet pressure have no effect on opening or closing the valve. In practice, the valve is slightly unbalanced so that very light forces from the inlet pressure will positively close the valve under no flow condition, and only light loads are required to initially actuate the valve.

An upper extension or plunger 44 extends beyond the valve 18 through the baffle 22. The plunger is reciprocally sealed, by means of a small diaphragm 46, through the baffle 22 to form a substantially fluid tight seal thereacross. A ball 48 is sealed or secured in the upper end of the plunger 44. A flexible diaphragm 50 substantially seals the valve mechanism within the confines of the passage 12. The diaphragm 50 is spaced apart from the baffle 22 by means of a spacing ring 52, forming a chamber II therebetween. The chamber II is the control chamber, since the difference of forces acting on the diaphragm 50 determines the operation of valve 18. A second flexible diaphragm 54 is held away from the diaphragm 50 by means of spacer 56, so as to form a chamber III therebetween. The flexible diaphragms are retained apart at the center by means of a brace 58 therebetween. The chamber III between the two flexible diaphragms exhausts to atmosphere by means of passages 60 through the wall of the spacer 56. As the flexible diaphragms are walls between two chambers of substantially different pressure the diaphragms must have a backing plate to prevent undue distortion into the adjacent chamber of lower pressure. The diaphragm 50 has a backing plate 51 immediately next thereto to prevent distortion of the diaphragm, and of the diaphragm 54 has a backing plate 55 immediately next thereto, likewise, to prevent the distortion of the diaphragm into chamber III.

A passage 62 is provided between the chamber II and the chamber III through the diaphragm 50, and the passage is normally closed by the ball 48 on the end of the plunger 44. A small orifice 64 provides a bypass around the ball into the passage 62, so that a small amount of fluid continuously bleeds from chamber II into chamber III, and to atmosphere via passage 60.

A tube 21 passing through the baffle 22 interconnects chamber II with the outlet 16. The tube extends a short distance into the outlet so that fluid passing through the outlet creates a lower pressure in chamber II by means of the venturi or eductor action. As the flow of fluid through the outlet increases, the pressure drop between chamber I (which is substantially outlet pressure) and chamber II increases, which causes a greater deflection of the diaphragm 50 resulting in greater valve opening and hence increases the capacity of the regulator, i. e., the amount of fluid actually passing through the device.

A passage 70 from the inlet 14 extends upwardly to an insert 71 having a passage 72 therethrough. The insert provides fluid tight passage means through the spacer rings and diaphragms. The insert 71 is sealed through the spacer rings by means of O-ring seal 73 at the bottom and O-ring seal 74 at the top thereof. The passage 72 leads into a lateral passage 76 which leads into a series of stepped passages 78 into a spring loaded pilot control valve. A plug 79 is provided at the exterior end of passage 78, for cleaning, guage port, etc.

The spring loaded regulator comprises a ball 85 seating against a cage 82 having a seat 84. A spring 80 normally urges the ball against the seat, and against a plunger 86. The upper end of the plunger 86 rests against a diaphragm insert 88 in a diaphragm 87. The diaphragm insert 88 has a passage 90 therethrough which is normally closed by the end of the upper end plunger 86. A spring 92 rests on a spring rest 91 interconnected with the diaphragm 87. The force of the spring against the diaphragm is controlled by means of a regulating screw 94 at the top end of the spring 92. A passage 81 interconnects the ball valve with chamber IV. A small passage 83 interconnects the control chamber of the regulator under the diaphragm 87 with chamber IV. A small opening 93 through the diaphragm insert 88 provides a constant bleed of a small amount of fluid from the control chamber (under the diaphragm 87) of the pilot regulator. The constant bleed greatly increases the precision of the regulator. The pilot regulator is, therefore, operating under a very low, constant flow (due to the constant bleed), and the pilot regulator precisely controls the pressure in the chamber IV and consequently the force on diaphragm 54. The constant bleed allows the ball 85 to seat on the seat 84 only instantaneously, or in other words, the ball is in constant motion or hunting during operation. This constant hunting permits greater accuracy in providing the desired pressure for chamber IV. The pilot regulator is a relieving type regulator, i. e., a passage 90 is provided to relieve sudden, large back surges of pressure. Smaller back surges are relieved by the constant bleed.

The spring loaded pilot regulator, operating at very low flow rates, pressures chamber IV to indirectly control the flow of fluid at a great range of rates through the main regulator. Both the pilot regulator and the main regulator have constant bleed control, so that the main regulator responds to very small demand changes, and supplies fluid at the desired pressure. Where a regulator does not have the constant bleed, the valve may seat for a substantial period of time, and because of the distortion of the seat, cohesion between the two, etc. an initial pressure of larger magnitude than the operating pressure is required to open the valve. This results in a sudden pressure drop on opening the valve. The constant bleed prevents this and provides smooth, precise control from opening the valve to high flow rates.

The pilot regulator supplies chamber IV with precise pressure under any distention of the diaphragm 54. This provides a uniform force acting on the valve 18 over the entire flow and pressure ranges of the main regulator.

The main regulator will therefore pass a large range of flow rates at a predetermined pressure, and the regulator will operate over a large range of pressures. As the valve of the main regulator operates at a uniform force, the capacity of the present regulator greatly exceeds the capacity of an equivalent size spring loaded regulator.

The device illustrated and described is by way of example only and not limitation. It is intended that substantial equivalents of the disclosed features of novelty be included within the scope and spirit of the claims.

I claim:

1. A pressure regulator comprising a body having a passage therethrough, inlet and outlet means associated with said passage, a first valve means adapted to open and close said passage, means associated with said first valve means for substantially balancing fluid pressure thereacross to about outlet pressure, a series of contiguous aligned chambers in said body comprising a first chamber eductively connected with said outlet means whereby fluid flowing out said outlet means lowers the pressure in said first chamber, a second chamber open to the atmosphere and segregated from said first chamber by a first flexible wall, and a third chamber segregated from said second chamber by a second flexible wall, means interconnecting said flexible walls whereby movement of one equally moves the other, plunger means interconnecting said first flexible wall and said first valve means to actuate the same, relief valve means interconnected with said plunger means and said first flexible wall for relieving excess pressure from said outlet means to said second chamber, and means including a spring-loaded pilot pressure regulator for supplying fluid from said inlet means at a predetermined pressure to said third chamber to actuate said first valve means, said means for supplying fluid including an independent passage from the inlet means through said body and a spring-pressed atmospheric relief valve in communication with said third chamber.

2. A pressure regulator comprising a body having a passage therethrough, inlet and outlet means associated with said passage, a first valve means adapted to open and close said passage, means including a small imperforate chamber and a connecting passage through said first valve to the outlet side thereof for subtantially balancing fluid pressure thereacross to about outlet pressure, a series of contiguous aligned chambers in said body comprising a first chamber eductively connected with said outlet means whereby fluid flowing out said outlet means lowers pressure in said chamber, a second chamber open to the atmosphere and segregated from said first chamber by a first flexible wall, and a third chamber segregated from said second chamber by a second flexible wall, means interconnecting said flexible walls whereby movement of one equally moves the other, plunger means interconnecting said first flexible wall and said first valve means to actuate the same, relief valve means interconnected with said plunger means and said first flexible wall for relieving excess pressure from said outlet means to said second chamber, and means including a spring loaded pilot pressure regulator for supplying fluid from said inlet means at a predetermined pressure to said third chamber to actuate said first valve means and control the pressure of fluid passing therethrough, said means for supplying fluid including an independent passage from the inlet means through said body and a spring-pressed atmospheric relief valve in communication with said third chamber.

3. A pressure regulator comprising a body having a passage therethrough, inlet and outlet means associated with said passage, a first valve means adapted to open and close said passage, means associated with said first valve for substantially balancing fluid pressure thereacross to about outlet pressure, a series of contiguous aligned chambers in said body comprising a first chamber eductively connected with said outlet means whereby fluid flowing out said outlet means lowers pressure in said first chamber, a second chamber open to the atmosphere and segregated from said first chamber by a first flexible wall, and a third chamber segregated from said second chamber by a second flexible wall, means interconnecting said flexible walls whereby movement of one equally moves the other, plunger means interconnected with said first flexible wall and said first valve to actuate the same, relief valve means interconnected with said plunger means and said first flexible wall for relieving excess pressure from said outlet means to said second chamber, a bypass around said first relief valve means for continuously bleeding a small amount of fluid from said outlet, and means including a spring-loaded pilot pressure regulator for supplying fluid from said inlet means at a predetermined pressure to said third chamber to actuate said first valve means, said means for supplying fluid including an independent passage from the inlet means through said body and a spring-pressed atmospheric relief valve in communication with said third chamber.

References Cited in the file of this patent

UNITED STATES PATENTS

| Number | Name | Date |
|---|---|---|
| 951,172 | Biedenmeister | Mar. 8, 1910 |
| 1,178,802 | Hamlin | Apr. 11, 1916 |
| 1,228,104 | Fulton | May 29, 1917 |
| 1,595,809 | Nichols | Aug. 10, 1926 |
| 1,956,977 | Shawn | May 1, 1934 |
| 2,150,460 | Riches | Mar. 14, 1939 |
| 2,196,279 | Thomas | Apr. 9, 1940 |
| 2,239,116 | Ray | Apr. 22, 1941 |
| 2,257,171 | King | Sept. 30, 1941 |
| 2,587,375 | Paulsen | Feb. 26, 1952 |